US011781654B2

(12) United States Patent
Bresso et al.

(10) Patent No.: US 11,781,654 B2
(45) Date of Patent: Oct. 10, 2023

(54) SEALING DEVICE FOR BICYCLE OR MOTORCYCLE SUSPENSIONS

(71) Applicant: AKTIEBOLAGET SKF, Gothenburg (SE)

(72) Inventors: Marco Bresso, Turin (IT); Andrea Serafini, Pinerolo (IT)

(73) Assignee: AKTIEBOLAGET SKF

( * ) Notice: Subject to any disclaimer, the term of this patent is extended or adjusted under 35 U.S.C. 154(b) by 22 days.

(21) Appl. No.: 17/507,575

(22) Filed: Oct. 21, 2021

(65) Prior Publication Data

US 2022/0128149 A1 Apr. 28, 2022

(30) Foreign Application Priority Data

Oct. 28, 2020 (IT) .................. 102020000025555

(51) Int. Cl.
*F16J 15/3232* (2016.01)
*B62K 25/06* (2006.01)

(52) U.S. Cl.
CPC ........... *F16J 15/3232* (2013.01); *B62K 25/06* (2013.01)

(58) Field of Classification Search
CPC .... F16J 15/00; F16J 15/16; F16J 15/50; F16J 15/52; F16J 15/32; F16J 15/3204; F16J 15/3232; F16J 15/3236; F16J 15/3276; F16J 15/322; F16J 15/3252; B62K 25/00; B62K 25/06; B62K 25/08; B62K 25/10; B62K 25/12; B62K 25/14; B62K 25/16; B62K 25/18; B62K 25/20; B62K 25/22; B62K 25/24; B62K 25/26

USPC ......................................... 277/562
See application file for complete search history.

(56) References Cited

U.S. PATENT DOCUMENTS

| 5,649,709 | A | * | 7/1997 | Munekata | ............ F16J 15/3232 277/575 |
| 6,186,507 | B1 | * | 2/2001 | Oldenburg | ............. F16J 15/324 277/374 |
| 2006/0103075 | A1 | * | 5/2006 | Zahn | ...................... B62K 25/08 277/436 |
| 2020/0300362 | A1 | * | 9/2020 | Selvapandian | ........ B62K 21/02 |

FOREIGN PATENT DOCUMENTS

| DE | 102009014817 | | 9/2010 | |
| WO | WO-2012039156 | A1 * | 3/2012 | ........... F16J 15/3268 |

OTHER PUBLICATIONS

"Rotary Seal Design Guide Catalog," https://www.parker.com/eps retrieved fro the internet: https://www.yumpu.com/en/document/view/28606254/clipper-parker-oil-seals-darcoid/; 3 pages.
Search Report for corresponding Italian Patent Application No. 102020000025555 dated Jun. 17, 2021.

* cited by examiner

Primary Examiner — Nathan Cumar
(74) Attorney, Agent, or Firm — Reed Smith LLP

(57) ABSTRACT

Sealing device for a cartridge of a shock absorbing fork, provided with a screen of metallic material and with an elastomer coating, in turn comprising a radially outer portion which forms a static seal on a cartridge housing and at least one radially inner lip which makes a sliding contact on a moving element of the cartridge, wherein an additional lip forms a seal on a surface of the housing, thus sealing a cavity (V) of the elastomer coating.

9 Claims, 3 Drawing Sheets

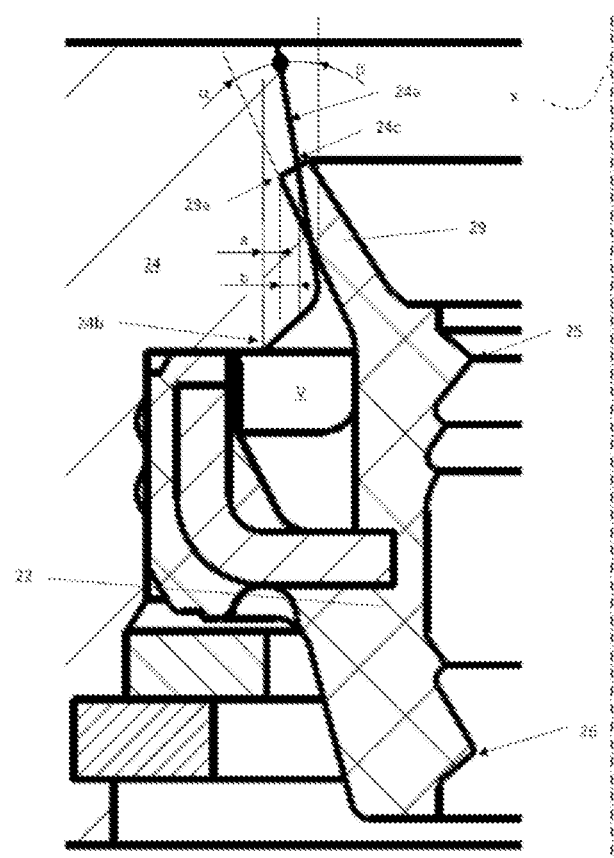
Fig. 3 – Detail Y

SEALING DEVICE FOR BICYCLE OR MOTORCYCLE SUSPENSIONS

CROSS-REFERENCE PRIOR APPLICATION

This application is based on and claims priority to Italian Patent Application No. 102020000025555 filed on Oct. 28, 2020, under 35 U.S.C. § 119, the disclosure of which is incorporated by reference herein.

TECHNICAL FIELD

The subject matter of the present disclosure relates to a sealing device for bicycle or motorcycle suspensions.

BACKGROUND

The suspension of a bicycle or motorcycle usually has the main function of absorbing the imperfections of the road and ensuring that the wheels remain in continuous contact with the ground as far as possible. Bicycle or motorcycle suspensions may include an elastic element, for example an air spring or a coil spring, which is load-bearing, and a hydraulic system or shock absorber capable of damping the oscillations resulting from a sudden change in the position of the wheel of the suspension.

DESCRIPTION OF THE DRAWINGS

The invention will now be described with reference to the attached drawings, which show a non-limiting example of its embodiment, in which:

FIG. 3 is a detail on an enlarged scale of the sealing device of FIG. 1.

DETAILED DESCRIPTION

Sealing devices in accordance with this disclosure are suitable for use in a fork containing the suspension of the bicycle or motorcycle.

In bicycles, a fork is the front part of the frame which receives the front wheel. The name is derived from the shape of this element, which is formed by a tube fixed to the frame and two arms that support the hub of the front wheel. For several years, mountain bikes have made use of forks with a pneumatic, hydraulic, or friction shock absorption system, with pneumatic, spring, or elastomer suspension, to promote the absorption of any roughness of the ground in a manner that is entirely similar to that of motorcycles. In various particular embodiments, one arm of the bicycle fork contains an elastic element, which is typically an air spring, while a second arm contains a damping element, typically an oil hydraulic piston.

Motorcycle suspension operates in a similar manner. By using such a suspension, movement of the frame relative to the ground is controlled, and, in particular, oscillation is damped and retarded by means of a shock absorber cartridge.

In the remainder of the present description, reference is expressly made to the shock absorbing fork of a bicycle, although the invention concerned is also applicable to motorcycle forks.

In an arm of a bicycle fork, a damping element is configured as a cartridge containing an oil hydraulic piston that moves inside it. In a chamber of the cartridge in which a piston moves, the working fluid, usually oil, is present on both sides of a piston head. The cartridge must be sealed to prevent the leakage of the working fluid, and an inlet for the lubricating oil outside the cartridge is present in an arm of the fork. If the two fluids, namely working oil and lubricating oil, are the same, it is acceptable for a small amount of lubricating oil to penetrate into the cartridge.

Regardless of the latter consideration, a cartridge must obviously be sealed from the outside by means of a suitable sealing device.

Figure 1:
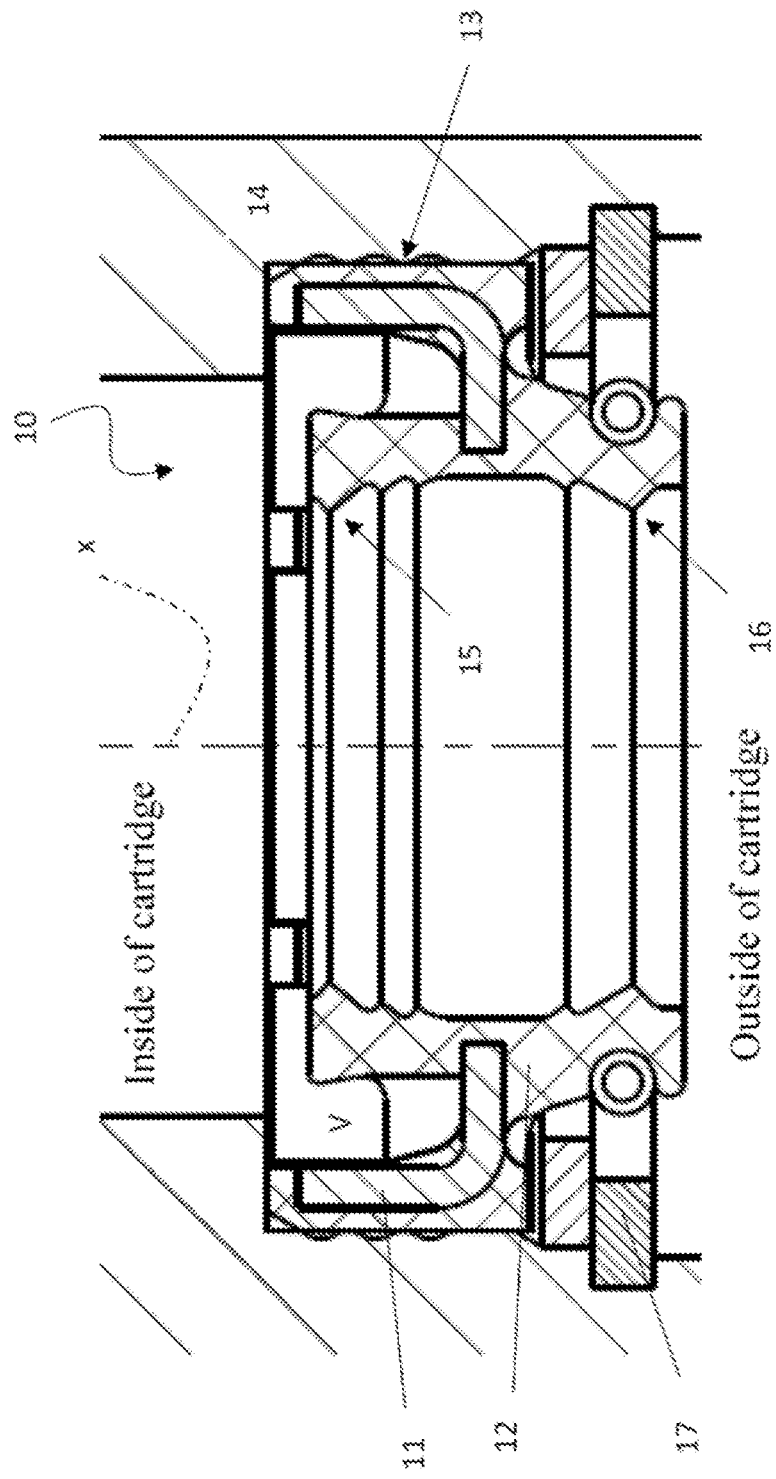
FIG. 1 is a sectional representation of a sealing device for suspension cartridges for bicycles or motorcycles according to the prior art.

FIG. 1 shows an example of an oil seal device of a standard type mounted on a moving rod in an axial symmetric view relative to an axis X of the rod (not shown in the figure). The sealing device 10 comprises a screen 11 of metallic material, preferably L-shaped, and an elastomer coating 12. Elastomer coating 12 has a portion 13 that forms a static seal on a cartridge housing 14. Coating 12 also has a first lip 15 and a second lip 16, which form radially inner dynamic seals (that is to say, seals on the moving rod), towards the inside of the cartridge and towards the outside of the cartridge along an axial direction, respectively. An inner seal is provided by an elastic element 17 which pushes the first lip 15 and the second lip 16 in a radially inward direction.

This solution, however, gives rise to a problem during the compression phase of the oil hydraulic piston. Sealing devices are optimized to operate correctly at a specific pressure which is relatively low. When the pressure increases, as will be shown, friction on the dynamic seals also increases.

In fact, as mentioned above, a cartridge of a front fork is a hydraulic shock absorber. The compression and expansion phases create a high or low oil pressures which acts on dynamic sealing lips, e.g., 15, 16. In particular, a high pressure (of about 1.5 MPa) that is established in cavity V of an elastomer coating creates a high radial load on the main lips that form the dynamic seal, resulting in high friction. Moreover, if powerful shocks are transmitted by the suspension, the friction peaks will be very high. In other words, the oil pressure acting on the main lips has a considerable effect on the friction perceived by the user. High friction in general is a problem, but friction peaks are even more of a problem.

Furthermore, owing to increasing global competition, customers are constantly demanding ongoing technical and economical improvements in sealing devices. In particular, customers require the greatest possible reduction in both friction and friction peaks, but is particularly concerned with the latter. Ideally, therefore, a sealing device of this type should be "indifferent" to the effects of pressure.

It is therefore necessary to define a sealing device which is free of the aforementioned problems, while providing a reliable seal at all times.

Figure 2:
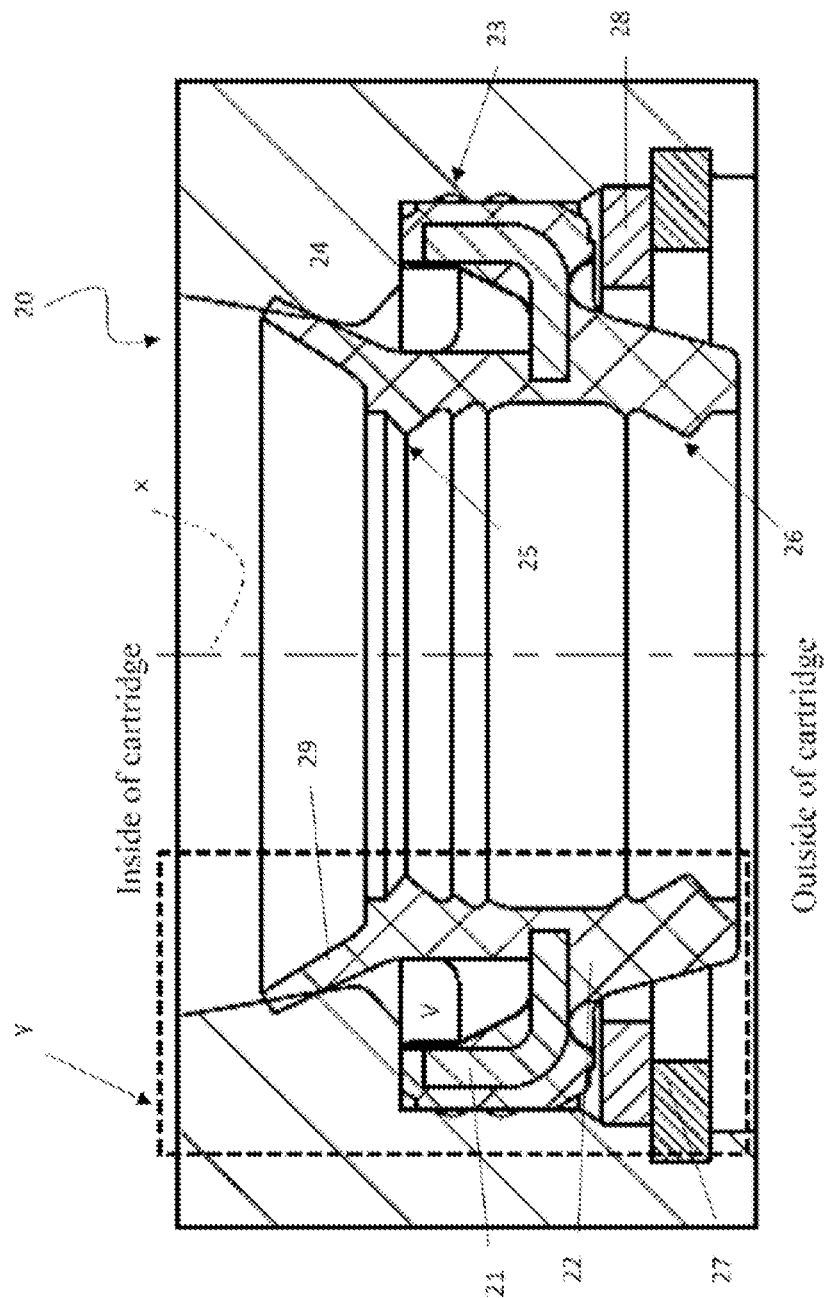
FIG. 2 is a sectional representation of a sealing device for suspension cartridges for bicycles or motorcycles according to an embodiment of the present invention.

Purely by way of non-limiting example, embodiments in accordance with this disclosure will be described with reference to a sealing device for a cartridge of a shock-absorbing fork of a bicycle. As mentioned above, sealing devices according to the present disclosure may also be applied to a motorcycle suspension. With reference to FIGS. 2 and 3, a sealing device 20 includes a screen 21 of metallic material, preferably L-shaped, and an elastomer coating 22.

An elastomer coating, e.g., 22, has a radially outer portion 23 that forms a static seal on a cartridge housing 24. An elastomer coating 22 also has a first lip 25 and a second lip 26, which form radially inner dynamic seals; that is to say, they make a sliding contact with a moving element of the cartridge (with a rod of the shock absorber piston, for example), towards an inside of the cartridge and towards an outside of the cartridge respectively.

A radially inner dynamic seal is further provided by an elastic element 27 which pushes first lip 25 and second lip 26 in a radially inward direction. A washer 28 ensures that sealing device 20 is correctly positioned.

Because of a higher pressures inside the cartridge, first sealing lip 25, which forms a dynamic seal on a moving rod on an inside of a cartridge, is shaped with a sharp edge. Conversely, since it has to withstand lower pressures, a second sealing lip 26, which forms a dynamic seal on a moving rod on an outside of a cartridge, is shaped with a rounded angle.

A sealing device 20 may be characterized by an additional lip 29 which acts as a one-way valve. When pressure increases, this additional lip 29 is pushed by the pressure and acts towards the housing of the shock absorber, thus forming a seal on a surface 24a of housing 24. When pressure increases, additional lip 29 makes the best use of the pressure peaks, by being pressed by the fluid on dedicated surface 24a, thereby sealing cavity V of the elastomer coating. This ensures that lips 25, 26 forming a dynamic seal toward both an inside and an outside of a cartridge are not exposed to high pressure peaks, and, as a further advantage, high contact pressures between the main lips and a moving rod are avoided, thereby reducing the friction between them.

When the pressure is reduced during an expansion phase, additional lip 29 may become detached from surface 24a of housing 24, and thus oil pressure in the cavity V between lips 25, 26 and additional lip 29 becomes the same as that present in the whole system.

Preferably, an entry chamfer 24b of sealing device 20, forming part of the housing 24, should be given a larger diameter than the diameter of the radially outer chamfer 29a of additional lip 29, to ensure the correct insertion of said additional lip. This is because sealing device 20 is mounted in a seat of housing 24 from the bottom upwards, and housing 24 must therefore have a sufficiently wide chamfer to allow additional lip 29 to be fitted as well. Therefore, dimension a, defined as half the difference between a diameter of chamfer 24b of housing 24 and a diameter of the radially outer chamfer 29a of additional lip 29, must be greater than zero. In embodiments, dimension a must be greater than, e.g., 0.1 mm.

The additional lip 29 must also provide radial interference with the housing 24 so as to ensure the sealing of the oil passage. Advantageously, therefore, dimension b, defined as half the difference between a diameter of radially outer chamfer 29a of additional lip 29 and a diameter of a radially outer contact point 24c of housing 24, must be between 0 and 1 mm, e.g., 0.1 mm, 0.5 mm, or 0.9 mm.

Additionally, surface 24a of housing 24 must be at an angle β to an axial direction defined by axis x such that a force of the pressure on additional lip 29 creates friction, causing additional lip 29 to remain in position without being bent back on itself. Advantageously, therefore, a value of angle β must be between 5° and 30°.

An angle α, defined as a difference between an angle of inclination of an additional lip 29 with respect to an axial direction and an angle β of the housing 24, as defined above, must be such that the additional lip 29 operates edgewise. This creates an increase in the contact pressure and therefore an increase in oil sealing on a radially outer chamfer 29a of an additional lip 29. Advantageously, therefore, the value of the angle α must be between 10° and 30°.

When the angles α and β are set in this way, the result—as demonstrated by finite element tests—is a deflection of additional lip 29, but not a complete radially inward bending of additional lip 29, which would cause detachment from surface 24a of housing 24. This ensures proper functionality of said additional lip 29. In embodiments, additional lip 29 is referred to as a valve lip. In embodiments, a valve lip, e.g., 29, is configured to form a seal on a surface of the housing by sealing a cavity (V) of the elastomer coating.

Finally, an advantage of the solutions proposed by the present disclosure is that constant friction is provided in a cartridge, avoiding problems caused by friction peaks in any state (compression, extension) of a fork. Thus, a virtually constant value of frictional resistance may be optimized during a design phase, since it now has a greatly limited range of values.

In order to substantially overcome the technical problems with motorcycle or bicycle suspensions, one object of the present disclosure is a new design of sealing device which has an additional lip acting as a one-way valve.

When pressure increases, in various embodiments an additional lip makes the best use of the pressure peaks, by being pressed by the fluid on a dedicated surface, thereby sealing the cavity of the elastomer coating. This ensures that the lips forming the dynamic seal toward the inside and the outside of the cartridge are not exposed to high pressure peaks, and, as a further advantage, high contact pressures between the main lips and the moving rod are avoided, thereby reducing the friction between them. When the pressure level decreases during the expansion of the damper, the additional lip returns to the initial position. Furthermore, when the pressure in the chamber of the shock absorber is below that in the cavity of the elastomer coating, the additional lip can become detached from the dedicated surface, thus returning the system to pressure equilibrium.

Thus, according to some embodiments, a sealing device for bicycle or motorcycle suspensions is provided, with the characteristics stated in the independent claim appended to the present description.

Further preferred and/or particularly advantageous embodiments are described according to the characteristics stated in the appended dependent claims.

In addition to the embodiment of the invention as described above, it is to be understood that there are numerous other variants. It is also to be understood that these embodiments are provided solely by way of example and do not limit the object of the invention or its applications or its possible configurations. On the contrary, although the description given above enables a person skilled in the art to implement the present invention according to at least one example of its embodiment, it is to be understood that numerous variations of the components described are possible without departure from the object of the invention as defined in the appended claims, which are interpreted literally and/or according to their legal equivalents.

The invention claimed is:

1. A sealing device for a suspension fork cartridge, the device comprising:
   a screen formed of a metallic material;
   an elastomer coating formed on at least a part of the screen, the elastomeric coating comprising:
      a radially outer portion forming a static seal on a housing of the cartridge;
      at least one radially inner lip configured to make sliding contact on a moving element of the cartridge; and a valve lip configured to form a seal on a surface of the housing and seal a cavity, wherein the cavity is defined on a radially outer side of the elastomer coating and is radially between the elastomer coating and the screen.

2. The sealing device of claim 1, wherein a dimension (a) is defined by half a first difference between a first diameter of a first chamfer of the cartridge housing and a second diameter of a radially outer chamfer of valve lip is greater than zero.

3. The sealing device of claim 2, wherein a dimension (b) is defined by half a second difference between the diameter of the radially outer chamfer of the valve lip and a third diameter of a radially outer contact point of the cartridge housing is between 0 mm and 1 mm.

4. The sealing device of claim 1, wherein an angle ($\beta$) formed between the surface of the cartridge housing and an axial direction defined by an axis (x) is between 5° and 30°.

5. The sealing device of claim 4, wherein an angle ($\alpha$) is defined by a difference between an inclination angle of the valve lip with respect to the axial direction defined by the axis (x) and the angle $\beta$, wherein the angle ($\alpha$) ranges between 10° and 30°.

6. A sealing device for a suspension fork cartridge, the device comprising:

a screen formed of a metallic material;

an elastomer coating formed on at least a part of the screen, the elastomeric coating comprising:

a radially outer portion forming a static seal on a housing of the cartridge housing;

a first radial lip comprising a sharp edge configured to make sliding contact on a moving element of the cartridge;

a second radial lip comprising a rounded angular edge configured to make sliding contact on a moving element of the cartridge; and a valve lip configured to form a seal on a surface of the housing and seal a cavity of the elastomer coating wherein an angle ($\beta$) is formed between the surface of the cartridge housing and an axial direction defined by an axis (x) and is between 5° and 30° and wherein an angle ($\alpha$) is defined by a difference between an inclination angle of the valve lip with respect to the axial direction defined by the axis (x), and wherein the angle ($\alpha$) ranges between 10° and 30°.

7. A sealing device for a suspension fork cartridge, the device comprising:

a screen formed of a metallic material;

an elastomer coating formed on at least a part of the screen, the elastomeric coating comprising:

a radially outer portion forming a static seal on a housing of the cartridge;

at least one radially inner lip configured to make sliding contact on a moving element of the cartridge; and a valve lip configured to form a seal on a surface of the housing and seal a cavity of the elastomer coating;

an elastic element configured to push against the at least one radially inner lip in a radially inward direction, the elastic element is axially positioned between a washer and the screen; and wherein a dimension (a) is defined by half a first difference between a first diameter of a first chamfer of the cartridge housing and a second diameter of a radially outer chamfer of valve lip is greater than zero, further wherein a dimension (b) is defined by half a second difference between the diameter of the radially outer chamfer of the valve lip and a third diameter of a radially outer contact point of the cartridge housing is between 0 mm and 1 mm.

8. The sealing device of claim 7, wherein the dimension (a) is greater than 0.1 mm.

9. The sealing device of claim 7, wherein the dimension (b) is 0.1 mm.

* * * * *